United States Patent
Klein

(10) Patent No.: US 9,372,979 B2
(45) Date of Patent: Jun. 21, 2016

(54) METHODS, DEVICES, AND SYSTEMS FOR UNOBTRUSIVE MOBILE DEVICE USER RECOGNITION

(76) Inventor: Geoff Klein, Tel Aviv (IL)

( * ) Notice: Subject to any disclaimer, the term of this patent is extended or adjusted under 35 U.S.C. 154(b) by 80 days.

(21) Appl. No.: 13/823,107

(22) PCT Filed: Jan. 5, 2012

(86) PCT No.: PCT/IL2012/000006
§ 371 (c)(1),
(2), (4) Date: Mar. 14, 2013

(87) PCT Pub. No.: WO2012/093393
PCT Pub. Date: Jul. 12, 2012

(65) Prior Publication Data
US 2013/0191908 A1    Jul. 25, 2013

Related U.S. Application Data

(60) Provisional application No. 61/430,549, filed on Jan. 7, 2011.

(51) Int. Cl.
| | |
|---|---|
| *G06F 21/36* | (2013.01) |
| *G06F 21/31* | (2013.01) |
| *H04W 12/06* | (2009.01) |
| *G06F 11/34* | (2006.01) |
| *H04W 88/02* | (2009.01) |

(52) U.S. Cl.
CPC ............ *G06F 21/36* (2013.01); *G06F 11/3438* (2013.01); *G06F 21/316* (2013.01); *H04W 12/06* (2013.01); *G06F 2221/2101* (2013.01); *G06F 2221/2141* (2013.01); *G06F 2221/2151* (2013.01); *H04W 88/02* (2013.01)

(58) Field of Classification Search
USPC .......................................................... 726/18
See application file for complete search history.

(56) References Cited

U.S. PATENT DOCUMENTS

2009/0320123 A1* 12/2009 Yu et al. .......................... 726/16

OTHER PUBLICATIONS

Yampolskiy et al., "Direct and Indirect Human Computer Interaction Based Biometrics", Dec. 2007, journal of Computers (JCP), vol. 2(10), pp. 76-88.*

(Continued)

*Primary Examiner* — Andrew Nalven
*Assistant Examiner* — Khang Do

(57) ABSTRACT

The present invention discloses methods, devices, and systems for unobtrusively recognizing a user of a mobile device. Methods including the steps of: unobtrusively collecting motion data from the mobile device during normal device usage by monitoring standard authorized-user interaction with the device, without any form of challenge or device-specified action; demarcating the motion data into user motion-sequences based on changes in a motion-state or an elapsed time-period without an occurrence of the changes, wherein the motion-state refers to a placement and speed of the mobile device at a point in time; calculating user motion-characteristics from the user motion-sequences; and generating a motion-repertoire from the user motion-characteristics, whereby the motion-repertoire enables unobtrusive recognition of the user. Preferably, the method further includes the step of: detecting unidentified motion-characteristics that are not associated with the motion-repertoire, thereby enabling unobtrusive recognition of unidentified usage.

22 Claims, 7 Drawing Sheets

(56) References Cited

OTHER PUBLICATIONS

Pusara et al., "User re-authentication via mouse movements," 2004, VizSEC/DMSEC '04: Proceedings of the 2004 ACM workshop on Visualization and data mining for computer security.*

Trujillo et al., "Haptic: the new biometrics-embedded media to recognizing and quantifying human patterns", 2005, Multimedia '05: Proceedings of the 13th annual ACM international conference on Multimedia.*

* cited by examiner

METHODS, DEVICES, AND SYSTEMS FOR UNOBTRUSIVE MOBILE DEVICE USER RECOGNITION

CROSS REFERENCE TO RELATED APPLICATIONS

This patent application claims priority under 35 U.S.C. §119(e) to U.S. Provisional Patent Application No. 61/430,549 filed Jan. 7, 2011, and under 35 U.S.C. §365(a) to PCT Patent Application No. IL2012/000006 filed Jan. 5, 2012, which are hereby incorporated by reference in their entirety.

FIELD AND BACKGROUND OF THE INVENTION

The present invention relates to methods, devices, and systems for unobtrusive user recognition and user authentication of mobile devices.

User authentication is an important component for providing secure access to a computerized system. Authentication allows a computerized system to know who the user is and to determine that the user is not impersonating the identity of an authorized user. Typically, passwords have been used to implement authentication of users to computerized systems, though other methods including biometric identification, one time tokens and digital signatures are also used.

A common drawback to such methods is that they are obtrusive to the user, requiring the user to remember and enter a sequence of characters, interact with a biometric device or be in possession of a device that generates one-time tokens each time that he wishes to access the computerized system.

In order to prevent secure information from being compromised by brute force attacks and searches, secure passwords need to be long, difficult to guess and frequently generated afresh. These aspects of maintaining protection increase the intrusive and cumbersome nature of passwords.

A mobile device is typically accessed multiple times daily and typically requires spontaneous and immediate access. The intrusive nature of current authentication techniques impedes their adoption on mobile devices, forcing users to forgo security in favor of usability. Currently available authentication methods have a low adoption rate among users of mobile devices as their obtrusive nature is not suited to the frequent and immediate usage patterns mandated by mobile device usage.

It would be desirable to have an unobtrusive method for authenticating a user to a mobile device that can also be exploited to provide authentication for accessing other computerized systems, performing secure payments or for unlocking physical barriers.

Modern mobile devices are equipped with multiple sensors which can be used for tracking Human Computer Interface (HCI) behavior patterns.

Prior art has suggested the use of various user behavior metrics generated by keyboard, mouse or haptic events to identify and authenticate authorized users to a computer terminal or network. In a paper titled "Direct and Indirect Human Computer Interaction Based Biometrics", Yampolskiy et al. (journal of Computers (JCP), Vol. 2(10), 2007, pp. 76-88) surveys the state of the art in direct and indirect human computer interaction based biometrics. Yampolskiy distinguishes between "Direct HCI biometrics" based on abilities, style, preference, knowledge, or strategy used by people while working with a computer and "indirect HCI-based biometrics" based on events that can be obtained by monitoring a user's HCI behavior indirectly via observable low-level actions of computer software.

Behavioral traits such as, voice, gait and keystroke have been suggested in the prior art for user identification. Although these behavioral traits can be used unobtrusively, there currently does not exist an economical and accurate method of user authentication using such traits.

SUMMARY OF THE INVENTION

It is the purpose of the present invention to provide methods, devices, and systems for unobtrusive user recognition and user authentication of mobile devices.

It is noted that the term "exemplary" is used herein to refer to examples of embodiments and/or implementations, and is not meant to necessarily convey a more-desirable use-case. Similarly, the terms "preferred" and "preferably" are used herein to refer to an example out of an assortment of contemplated embodiments and/or implementations, and is not meant to necessarily convey a more-desirable use-case. Therefore, it is understood from the above that "exemplary" and "preferred" may be applied herein to multiple embodiments and/or implementations.

Embodiments of the present invention provide methods, devices, and systems for unobtrusively recognizing an authorized user by a mobile device, maintaining the security of the mobile device and providing the mobile device with the capability to perform such recognition based on a comparison between current and previously recorded HCI behavior metrics.

HCI behavior patterns can be monitored and combined in different configurations to create "usage repertoires" that reflect unique behavior patterns of a specific individual user, allowing a device to recognize and identify an authorized user.

According to embodiments of the present invention, multiple features of a user's HCI behavior on a hand-held mobile device are continually and unobtrusively sampled, discretized and monitored during normal operation of the device. Software on the device learns the usage repertoire of an authorized user from the samples, and is able to distinguish between the authorized user of the device and an unauthorized user by comparing a current HCI characteristic to a learned repertoire in real-time and to block access to features of the device or perform other defensive actions when software on the device determines that it is in the hands of an intruder.

According to some embodiments, the system samples a dynamically selected subset of HCI characteristics that are accessible from a mobile device to optimize performance and maximize recognition accuracy.

Recognition of an authorized user by a mobile device can be exploited to facilitate provision of secure automatic authentication to services on a network, to enable performing secure payments from a mobile device, to allow a mobile device to act as a universal key for unlocking physical barriers like a door or car ignition or to identify friendly forces in a battle field environment.

Therefore, according to the present invention, there is provided for the first time a method for unobtrusively recognizing a user of a mobile device, the method including the steps of: (a) unobtrusively collecting motion data from the mobile device during normal device usage by monitoring standard authorized-user interaction with the device, without any form of challenge or device-specified action; (b) demarcating the motion data into user motion-sequences based on changes in a motion-state or an elapsed time-period without an occurrence of the changes, wherein the motion-state refers to a placement and speed of the mobile device at a point in time; (c) calculating user motion-characteristics from the user motion-sequences; and (d) generating a motion-repertoire from the user motion-characteristics, whereby the motion-repertoire enables unobtrusive recognition of the user.

Preferably, the method further includes the step of: (e) detecting unidentified motion-characteristics that are not associated with the motion-repertoire, thereby enabling unobtrusive recognition of unidentified usage.

Most preferably, the method further includes the step of: (f) upon the step of detecting, triggering a defensive action and/or providing authentication services, wherein the defensive action includes at least one action selected from the group consisting of: blocking access to the device, blocking access to selected applications, deleting sensitive data, encrypting sensitive data, setting off a siren, sending a notification to a designated individual associated with the device, and wherein the authentication services include at least one service selected from the group consisting of: privacy protection, authentication to an external system, use as a universal key, authorizing a payment, and identifying friendly forces in a battle-field environment.

Most preferably, the step of detecting is performed repeatedly during the normal device usage, thereby providing perpetual protection of the device from unauthorized usage.

Preferably, the motion data is obtained from at least one sensor selected from the group consisting of: a motion sensor, a haptic sensor an accelerometer, a gyroscope, and a combination thereof.

Preferably, the step of generating is performed repeatedly during the standard authorized-user interaction, thereby providing ongoing improvement to recognition accuracy.

More preferably, the method further includes the step of: (e) determining a learning-stage parameter as a degree of user recognition, wherein the step of determining is performed by at least one method selected from the group consisting of: automatically basing the learning-stage parameter on a quantity of the motion-sequences collected, time elapsed, or a statistical variation of the motion data collected; and manually setting the learning-stage parameter by the user.

Most preferably, the learning-stage parameter is operative to regulate a trigger for a defensive action and/or providing authentication services upon detecting unidentified motion-characteristics that are not associated with the motion-repertoire.

Preferably, the step of collecting is performed at a frequency based on the motion-state.

Preferably, the motion-state is determined by: (i) comparing at least one current motion-sensor value to at least one prior motion-sensor value; and (ii) assessing a degree of change in the motion-sensor values based on an Absolute Total Acceleration Change (ATAC).

Preferably, the placement has at least one designation selected from the group consisting of: a hand-held state, an on-body state, a pocket state, a flat rest-state, and a non-flat rest-state; and wherein the speed has at least one designation selected from the group consisting of: a traveling state at or above a delimited speed, a walking state, a running state, a hand-moving state, a stable state, and a motionless state.

Preferably, the method further includes the steps of: (e) discretizing the motion-characteristics into discrete values; and (f) selectively increasing the number of the discrete values, thereby dynamically controlling recognition accuracy.

According to the present invention, there is provided for the first time a device for unobtrusively recognizing a mobile-device user, the device including: (a) a processing module including: (i) a CPU for performing computational operations; (ii) a memory module for storing data; and (iii) at least one sensor for detecting interaction with the device; and (b) a recognition module, operationally connected to the processing module, configured for: (i) unobtrusively collecting motion data from the mobile device during normal device usage by monitoring standard authorized-user interaction with the device, without any form of challenge or device-specified action; (ii) demarcating the motion data into user motion-sequences based on changes in a motion-state, wherein the motion-state refers to a placement and speed of the mobile device at a point in time; (iii) calculating user motion-characteristics from the user motion-sequences; and (iv) generating a motion-repertoire from the user motion-characteristics, whereby the motion-repertoire enables unobtrusive recognition of the user.

According to the present invention, there is provided for the first time a non-transitory computer-readable medium, having computer-readable code embodied on the non-transitory computer-readable medium, the computer-readable code including: (a) program code for unobtrusively collecting motion data from the mobile device during normal device usage by monitoring standard authorized-user interaction with the device, without any form of challenge or device-specified action; (b) program code for demarcating the motion data into user motion-sequences based on changes in a motion-state, wherein the motion-state refers to a placement and speed of the mobile device at a point in time; (c) program code for calculating user motion-characteristics from the user motion-sequences; and (d) program code for generating a motion-repertoire from the user motion-characteristics, whereby the motion-repertoire enables unobtrusive recognition of the user.

According to the present invention, there is provided for the first time a method for unobtrusively recognizing a mobile-device user, the method including the steps of: (a) providing a plurality of motion-sequences demarcated from motion data of a plurality of users of mobile devices; (b) calculating user motion-characteristics from the plurality of motion-sequences; (c) aggregating user motion-characteristics to produce population motion-characteristics; and (d) generating a differentiation-template for the user by comparing the user motion-characteristics to the population motion-characteristics.

According to the present invention, there is provided for the first time a system for unobtrusively recognizing a mobile-device user, the system including: (a) a server including: (i) a CPU for performing computational operations; (ii) a memory module for storing data; and (b) a processing module configured for: (i) providing a plurality of motion-sequences demarcated from motion data of a plurality of users of mobile devices; (ii) calculating user motion-characteristics from the plurality of motion-sequences; (iii) aggregating user motion-characteristics to produce population motion-characteristics; and (iv) generating a differentiation-template for the user by comparing the user motion-characteristics to the population motion-characteristics.

According to the present invention, there is provided for the first time a non-transitory computer-readable medium, having computer-readable code embodied on the non-transitory computer-readable medium, the computer-readable code including: (a) program code for providing a plurality of motion-sequences demarcated from motion data of a plurality of users of mobile devices; (b) program code for calculating user motion-characteristics from the plurality of motion-sequences; (c) program code for aggregating user motion-characteristics to produce population motion-characteristics; and (d) program code for generating a differentiation-template for the user by comparing the user motion-characteristics to the population motion-characteristics.

These and further embodiments will be apparent from the detailed description and examples that follow.

BRIEF DESCRIPTION OF THE DRAWINGS

The present invention is herein described, by way of example only, with reference to the accompanying drawing, wherein.

DESCRIPTION OF THE PREFERRED EMBODIMENTS

Figure 1:
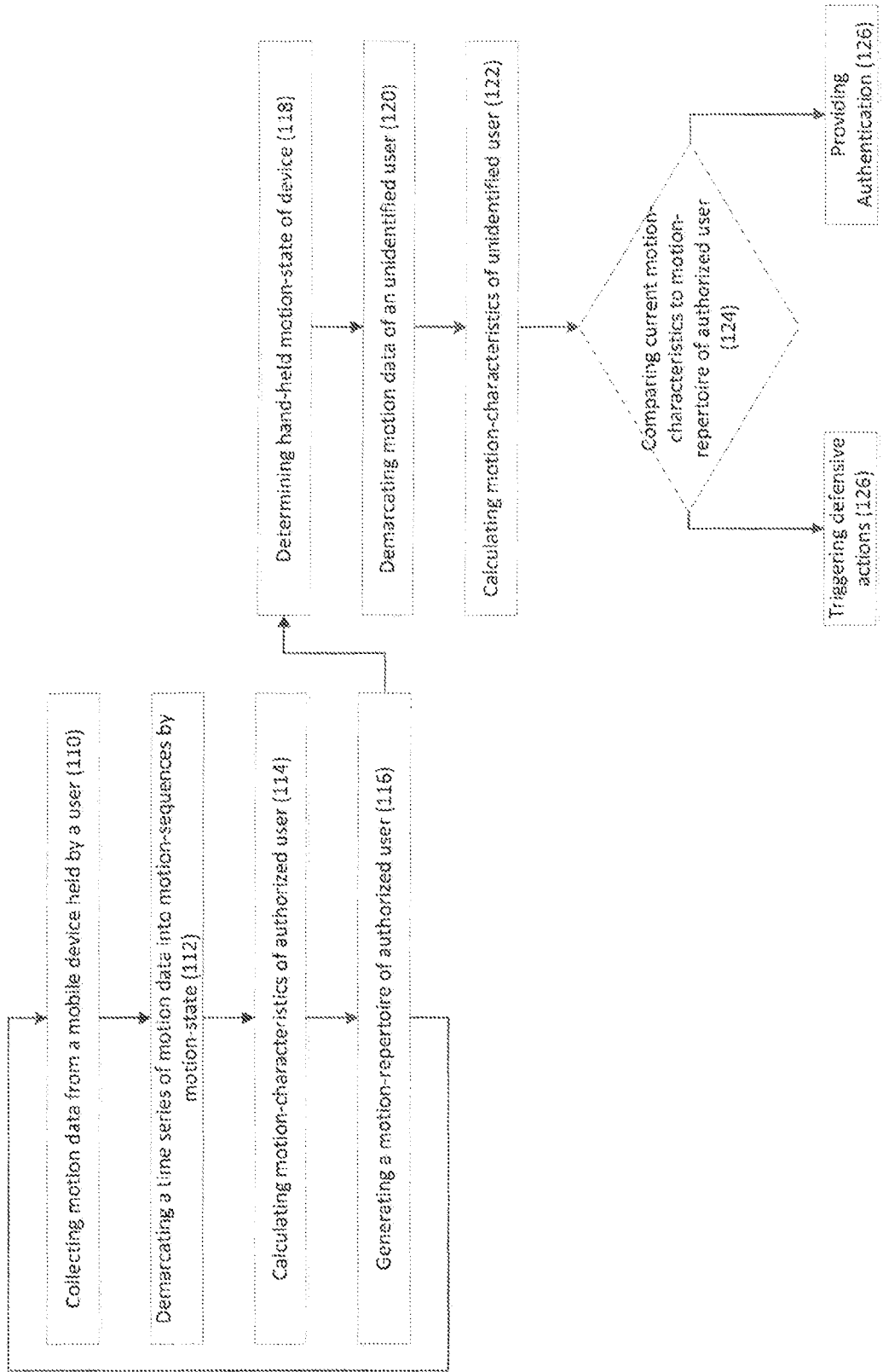
FIG. 1 schematically illustrates a method for user recognition based on comparing motion-characteristics of a current user to a motion-repertoire of an authorized user, according to preferred embodiments of the present invention.

The present invention relates to methods, devices, and systems for unobtrusive user recognition and user authentication of mobile devices. The principles and operation for such methods, devices, and systems, according to the present invention, may be better understood with reference to the accompanying description and drawings.

The present invention is described herein by way of examples that demonstrate various techniques that can be used for teaching a mobile device to recognize an authorized user. Recognition is implemented by comparing the motion-characteristics of a current user interaction to a motion-repertoire comprising previously collected motion-characteristics collected while an authorized user operates a mobile device. Terminology that is used for describing the invention is defined below:

Motion-state refers to the placement and speed of motion of a hand-held device at some point in time, wherein placement can have values: "in user's hand", "in pocket", "resting on flat surface" or "other non-flat resting state not attached to a user" and speed can have values: "traveling at above 20 km/hour", "walking or running", "device moving in hand while user is standing or sitting", "device stable in hand while user is standing or sitting" and "motionless". Motion-state is extrapolated from an analysis of sensor data collected from the device.

A motion-sequence refers to a collection of motion data parameters extracted from one or more sensors on the device simultaneously over a period of time. Motion-sequences are demarcated from a continual stream of collected sensor data based on changes in motion-state or after a time interval has elapsed.

Motion-characteristics are obtained by calculating aggregations on the data contained in each motion-sequence. Aggregations calculated may include, sum, average, maximum, minimum, first, last, standard deviation and others; which are performed on individual motion parameters in a motion-sequence or on combinations of these parameters; characteristics may also be calculated on the change in value of a parameter or combination of parameters in relation to the value of a previously collected sample in a time sequence; they can also be based on aggregations calculated separately on a value change in the positive or in the negative direction.

A motion-repertoire refers to a collection of motion-characteristics which are captured while an individual authorized user is operating the device. The motion-repertoire of a user expands over time as new aspects of the user's motion behavior are encountered while operating the device.

A differentiation-template refers to the set of motion-characteristics that best differentiate an individual user from the motion-characteristics calculated for a population of users. Differentiation-templates are determined by analyzing the frequencies of occurrence of each motion-characteristic of an individual user and comparing these to the frequencies of occurrence of motion-characteristics in the population. Various statistical techniques may be used for determining the best differentiating characteristics including Bayesian analysis, clustering and others. Differentiation-templates are used by software on the device to efficiently capture, analyze and compare only motion-characteristics that best differentiate an individual user from the motion-characteristics of the population.

Learning-stage parameter refers to the degree of recognition by a mobile device of an authorized user. A learning-stage parameter can be determined automatically by the system or determined manually by the authorized user. Factors that can be used for automatic determination of learning-stage include the quantity of motion-sequences collected, time elapsed, statistical variation of the data, consistency of differentiation-templates over time and analysis of FAR (False Acceptance Ratio) and a FRR (False Rejection Ratio) values determined from a comparison of motion-sequences of a population to the motion-repertoire of an authorized user. The learning-stage parameter is used in various embodiments to assist in recognition, determine defensive actions and efficiently regulate the frequency that certain actions are performed to provide an optimum balance between device performance and recognition accuracy.

Embodiments of the present invention enable HCI metrics (and others), used in isolation or in combination via software (as well as embedded hardware or firmware) running on the device and/or on a remote server, to sample usage characteristics, and to store a representation of a user's unique, HCI behavioral usage repertoire. Implementations can be configured for security devices in which the monitoring cannot be overridden.

According to some embodiments HCI metrics (other or in addition to device movement and placement) can be used. Some HCI metrics that can be measured on a mobile device include: geographic location (e.g., as measured by a GPS sensor on the device), orientation and location in 3-dimensional space (e.g., as indicated by an onboard gyroscope), velocity and direction (e.g., as measured from motion detectors), type, position and frequency of touch screen events, time interval between clicks on a virtual or physical keyboard, frequency of specific key clicks, frequency of combinations of key clicks, time of day, intervals between idle and active usage, frequency of application usage, angle between current and previous cursor locations, intervals between start of phone ring and call pickup, distance between fingers touching the screen when using multi touch gestures, frequency of word occurrence in SMS messages, length of SMS messages, call durations and others.

HCI metrics can also include other forms of interactive control, such as pen taps, strokes, swipes and flicks, as well as "hovering" signals and visual gesture recognition (e.g., from motion based devices like Microsoft's Kinect™). Any of these metrics and others can be used in isolation or in combination by software running on the device and/or on server components to sample usage patterns and to store a representation of a user's unique HCI behavioral repertoire.

A method for mobile device user recognition according to an embodiment of the invention is schematically illustrated in FIG. 1.

According to one embodiment a method for mobile device user recognition includes the general steps of: collecting motion data from the mobile device (e.g., from sensors on the mobile device) while the device is held by an authorized user (110); demarcating a time series of motion data into motion-sequences based on changes in the motion-state of the device (112), wherein a motion-state describes motion and placement of the device at a point in time and may be extrapolated from ongoing analysis of the sensor data collected from the device; calculating motion-characteristics per motion-state of the authorized user by performing aggregations on a motion-sequence (114); generating a motion-repertoire from the motion-characteristics of the authorized user; (116); determining that the device is in a hand-held state which indicates the device is being held in a user's hand (118); demarcating motion data of an unidentified user into motion-sequences in a hand-held motion-state (120); aggregating data contained in each motion-sequence to calculate motion-characteristics of the unidentified user (122); comparing current motion-characteristics of the device in the hand held state to the motion-repertoire of an authorized user to determine if the device is being held by the authorized user (124); and triggering defensive actions or providing authentication services based on the comparison (126). E.g., triggering defensive actions if the comparison shows that the device is not being held by the authorized user and providing authentication services in the case that motion-characteristics calculated on motion parameters sampled during current operation are consistent with a prior motion-repertoire of the authorized user.

In the embodiment illustrated in FIG. 1 detecting a hand held state of the device and determining motion-characteristics of the user per the hand held state is one option but other motion-states of the device may be used for detecting an authorized user.

According to some embodiments, determining a motion-state of a device includes obtaining a sample of motion data of the device. Motion data may include acceleration data of the device. In one embodiment at least one attribute is added to the sample of motion data.

For example, a background software service running on a mobile device may receive accelerometer events at a sampling frequency of, for example, ~every 0.22 seconds. The software "embellishes" the raw accelerometer data (time, x, y, z) with additional attributes (e.g., duration of the current sample and changes in x, y, and z readings from the previous sample (dX, dY, dZ)) calculated during collection and may output a record comprising 8 attributes for each event sampled:

| Time | X | Y | Z | Duration | dX | dY | dZ |
|------|---|---|---|----------|----|----|----|

Determination of motion-state is performed using moving averages calculated on the summed dX, dY, dZ attributes over, for example, 3-second periods.

According to one embodiment a motion-state of a device is determined by speed (acceleration*time) and using thresholds for Absolute Total Acceleration Change (ATAC) (=abs(dX)+abs(dY)+abs(dZ)) calculated on the moving averages. For example, a resting motion-state (value of 13 in Table 1) would be determined when 0.6<ATAC<0.1 (between threshold1 and threshold2).

According to one embodiment, determination of placement is performed based on the ATAC and the device orientation angle extrapolated from the moving averages of the x, y, z values. For example, a static flat motion-state (value of 20 in Table 1) would be determined when ATAC<0.1 and (x>−0.22 and y<0.22 and z<−9.72 and z>−9.92).

For example, the background software may analyze the stream of embellished accelerometer data to determine the current motion-state of the device. It may distinguish, for example, 20 separate motion-states as shown by a combination of motion and placement indicated, as an example, in Table 1.

TABLE 1

|  |  | Placement | | | |
|---|---|---|---|---|---|
|  |  | Hand | Pocket | Stand* | Flat |
| Mo-tion | Traveling (speed > 20 km/hour) | 1 | 2 | 3 | 4 |
|  | Walking (speed > 3 km/hour) | 5 | 6 | 7 | 8 |
|  | Moving (above Absolute Total Acceleration Change (ATAC) threshold2, see above) | 9 | 10 | 11 | 12 |
|  | Resting (below ATAC threshold2, see above) | 13 | 14 | 15 | 16 |
|  | Static (below ATAC threshold1, see above) |  | 18 | 19 | 20 |

*Device is held on a stand (for example in a car), or supported by some other inanimate object.

According to one embodiment motion-states 9 and 13 are of primary interest for unauthorized user recognition. States 10, 11, 12, 14, 15, 16 and 17 are less relevant for user recognition. Traveling or walking motion-states of the device may be of less interest, since typically, moving and resting states imply that a user is operating the device. Thus, according to some embodiments, a motion-sequence of a device is used only if it is in a hand-held motion-state (9 or 13).

A data stream may be demarcated into motion-sequences by further embellishing the output record for each event sampled with 2 additional attributes: the motion-state determined and a counter (indicating the sequence of each event in a motion-sequence comprising samples having the same motion-state) resulting in an (exemplary) output record with the following attributes:

| Time | X | Y | Z | Duration | dX | dY | dZ | State | Count |
|------|---|---|---|----------|----|----|----|-------|-------|

Aggregations for calculating a motion-characteristic at Step 114 may include sum, average, standard deviation, minimum, maximum, first, last and others. Aggregations may be calculated on each motion-sequence on each of the x, y, z, dx, dy, dz, time and duration values. Aggregations may be calculated on various derivatives and combinations of the values.

A Jitter motion-characteristic, for example, can be derived by separately summing the positive and negative changes dX, dY, dZ for each motion-sequence. The difference between absolute positive and negative changes reflects actual movement in a direction on each of the X, Y and Z axes, while the remaining quantities of positive and negative acceleration change (that cancel each other out in summation) can be attributed to jitter. By comparing jitter when the device is resting on a table to jitter when the device is held by a user, jitter resulting from measurement artifacts of the device can be filtered out to derive quantities that reflect the amount of shake (jitter) by an individual's hand on each of the X, Y and Z axes while the user is holding the device.

According to some embodiments the step of obtaining a sample of motion data of the device (110) is performed at a frequency that is based on the determined motion-state of the device.

Figure 2:
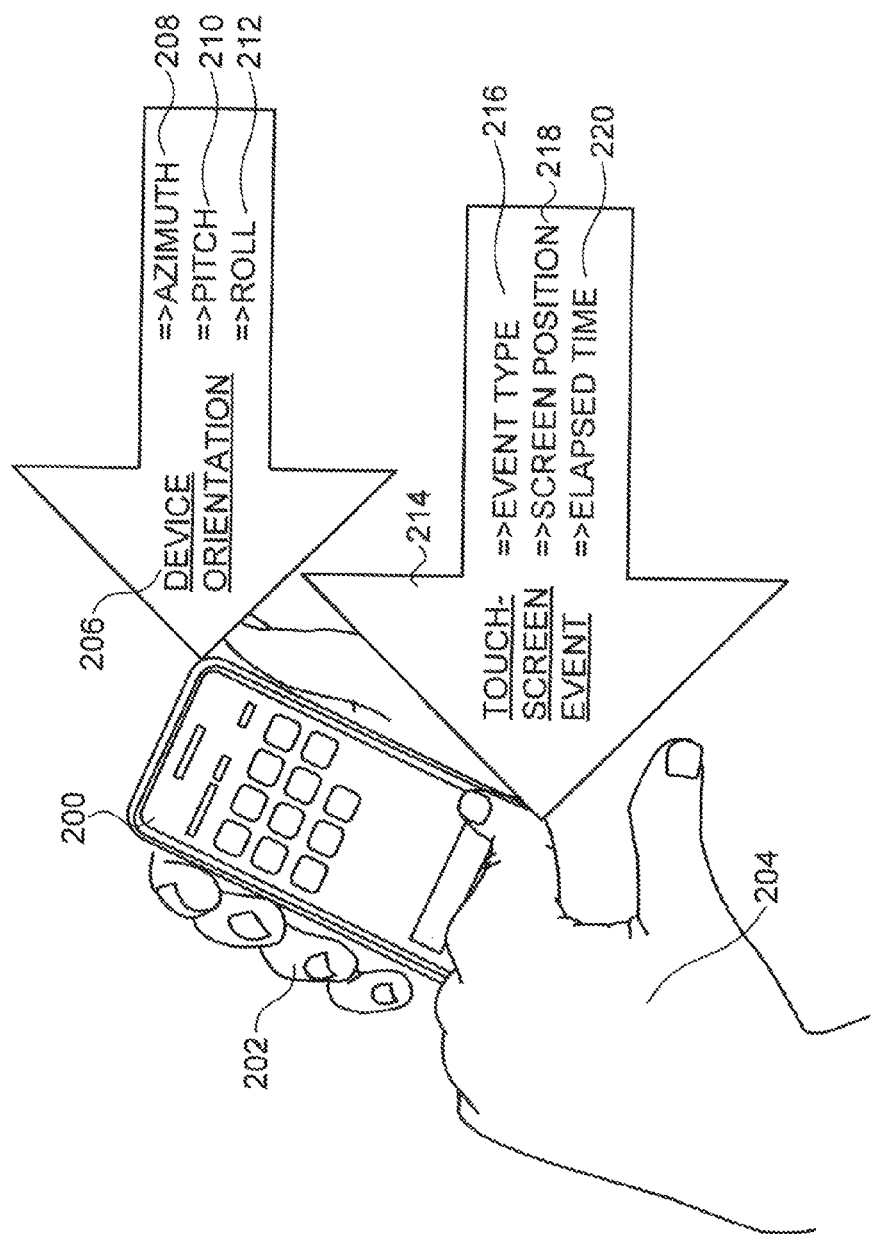
FIG. 2 schematically illustrates a user operating an exemplary mobile device showing various HCI—event signals for device orientation and touch screen events, according to preferred embodiments of the present invention.

A user operating an exemplary mobile device showing various HCI-event signals for device orientation and touch screen events, according to an embodiment of the invention, is schematically illustrated in FIG. 2.

An exemplary mobile device 200 is shown in a user holding hand 202 and a user interacting hand 204 (FIG. 2 is illustrative and not meant to imply left-or right-handed use). Ambidextrous use of mobile device 200 and operation of mobile device 200 with one hand only are also within the scope of the present invention.

User holding-hand 202 can also interact with mobile device 200 through contact (e.g., buttons, sensors and sliders); likewise, user interacting-hand 204 can also partially hold mobile device 200 when mobile device 200 is supported with both hands.

While mobile device 200 is depicted as a hand held device (e.g., an iPod or smartphone) with a touch screen, other mobile devices (e.g., slate computers, tablets, laptops, PDAs, still-image cameras, video cameras, remote controls, authentication keypads and e-readers) are also considered within the scope of the invention.

A device orientation 206 is an exemplary category of HCI-event signals which can include signals such as an azimuth 208 (i.e., in degrees representing the angle between the x-axis of the device and the north direction wherein 0<azimuth≥360), a pitch 210 (i.e., in degrees representing the angle made by the y-axis of the device relative to the device's horizontal position, wherein −180<pitch≥180), and a roll 212 (i.e., in degrees representing the angle made by the x-axis of the device relatively to the device's horizontal position, wherein −90<roll≥90, for example).

Another exemplary category of HCI-event signals is a touch screen event 214 (i.e., a haptic HCI attribute) which can include signals such as an event type 216 (e.g., down, up or move; representing a user placing one or more fingers on the touch screen of the mobile device, a user lifting one or more fingers from the touch screen, or a user moving one or more fingers across the surface of the device, respectively), a screen position 218 (i.e., x-y coordinates of the area of the touch screen that was touched) and an elapsed time 220 (e.g., the interval in milliseconds elapsed since the prior touch screen event), for example.

Monitoring the coincidence of HCI-event signals such as device orientation 206 and touch screen event 214 provides strong differentiation between individual users, since such HCI—event signals capture physical attributes of the user that are projected in coordinated hand movements while the user manipulates the device.

According to one embodiment, a system samples and stores motion-characteristics in a probability table that represents the unique motion-repertoire of the device's authorized user, allowing the device to recognize and block unauthorized users from accessing device functionality or to trigger other defensive actions.

Modern mobile devices typically have services which trigger HCI events when the screen is touched and also allow applications to obtain orientation information from the operating system. By sampling such HCI events and using, for example, a Bayesian network to represent a user's motion-repertoire in a probability table, the device is able to "learn" the unique motion-characteristics of an authorized user for real-time monitoring.

Sampling and learning may take place in the background while a user is interacting with the device, providing an unobtrusive, passive training and monitoring system.

A mobile device typically triggers between 5 and 40 events per second; thus, several hours of usage are adequate for collecting a sufficiently large sample of HCI events that will allow the device to uniquely recognize the authorized user, according to embodiments of the invention.

Figure 3:
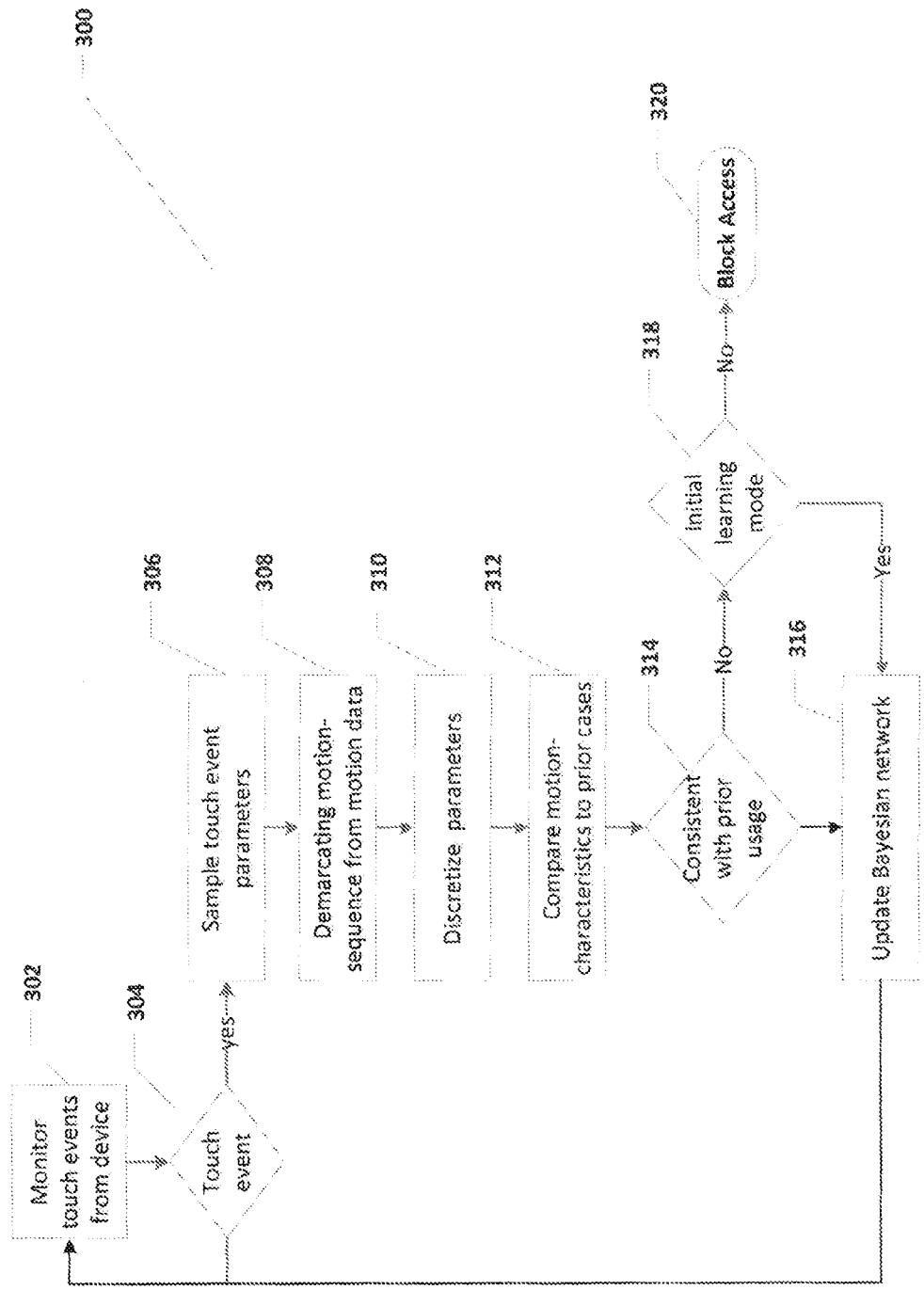
FIG. 3 is a simplified flowchart of process steps for performing continuous background monitoring, learning and detection by an exemplary mobile device, according to preferred embodiments of the present invention.

FIG. 3 shows a simplified flowchart of major process steps for performing continuous background monitoring learning and detection of a user's motion-characteristics from a mobile device, according to one embodiment of the invention.

According to one embodiment, Flowchart 300 starts with the system monitoring touch screen events registered by the device (Step 302). When a user begins interacting with the device, a touch event is intercepted by the system (Step 304), resulting in the system sampling parameters associated with the event (Step 306) (e.g., event type 216, screen position 218, and elapsed time 220) associated with touch screen event 214. The system then demarcates a motion-sequence from the stream of motion data (e.g., azimuth 208, pitch 210, and roll 212) associated with device orientation 206 based on the change to a hand-held motion-state as determined by the touch event 214 (Step 308).

The system then calculates motion-characteristics from the values sampled for each of the parameters in the motion-sequence and "discretizes" (Step 310). Parameter discretization, which is used in a Bayesian network for analyzing usage patterns, is discussed with reference to FIG. 4.

The discretized motion-characteristics are then compared to a Bayesian network's prior probability table comprising the motion-repertoire of all prior motion-characteristics sampled from the authorized user (Step 312) and the system determines if the motion-characteristics of the sample are consistent with the motion-repertoire of the authorized user (Step 314).

This exemplary implementation uses Bayesian techniques to match a current sample of motion-characteristics to the joint probability distribution for the set of all prior motion-characteristics collected from the authorized user and to determine a likelihood probability that the current motion-characteristics were generated while the device was held by an authorized user. Other statistical techniques may be used for determining that a set of current motion-characteristics differs significantly from a previously collected motion-repertoire.

In the case that the current motion-characteristics are determined by the system to be consistent with the probability table of prior motion-characteristics (the motion-repertoire), cases of a Bayesian network are then updated with the discretized values of each fresh motion-characteristic sampled (Step 316) and the system continues monitoring touch events (Step 302).

In the case that the current motion-characteristics are inconsistent with the motion-repertoire, the system determines if it is in an initial learning mode (Step 318) based on a learning-stage parameter held by the system (see below).

In the case that the learning-stage parameter determines that the device is in initial learning mode (Step 318), cases of a Bayesian network are then updated with the discretized motion-characteristics sampled (Step 316) and the system continues monitoring touch events (Step 302).

In the case that learning-stage parameter determines that the device has completed its initial learning phase (Step 318), the system notifies the user that he is not authorized to use the device and access to protected features of the device are blocked (Step 320).

According to some embodiments the system is able to dynamically determine when a sufficient number of motion-characteristics have been learned by the device to facilitate accurate recognition and to dynamically set the value of the learning-stage parameter based on this determination.

Automatic determination can be based on, for example, the quantity of collected motion-characteristics, a period of learned user activity, analyzing a statistical distribution of collected motion-characteristics or monitoring the rate of new motion-characteristics that are added to the motion-repertoire. Alternatively, a user can indicate directly to the system that an initial sampling period of motion-characteristics is complete. Following completion of initial learning, the system may continue to sample and learn the HCI usage pattern of the device owner but when the device detects a usage pattern that does not match the existing motion-repertoire of usage behavior, the device may block the user from accessing protected features of the device (320) (which can include stored information or functionality (e.g., call initiation)).

The threshold value for detection as well as the defensive actions triggered when unauthorized operation is detected (320) may be determined using the learning-stage parameter of the device. For example, in the case of a new device/user having a low learning-stage parameter, an unauthorized user will be detected when the background process detects a motion-characteristic that scores below a threshold value of 10, and a lenient defense strategy may be applied, for example, beep during the first 2 detections, lock the device on the third detection and send a message on the fourth detection. In the case of an experienced device/user having a high learning-stage parameter, a score below −20 may be required to trigger defensive actions (320), which may be for example: beep+lockout+message at the first instance an unauthorized user is detected.

Figure 4:
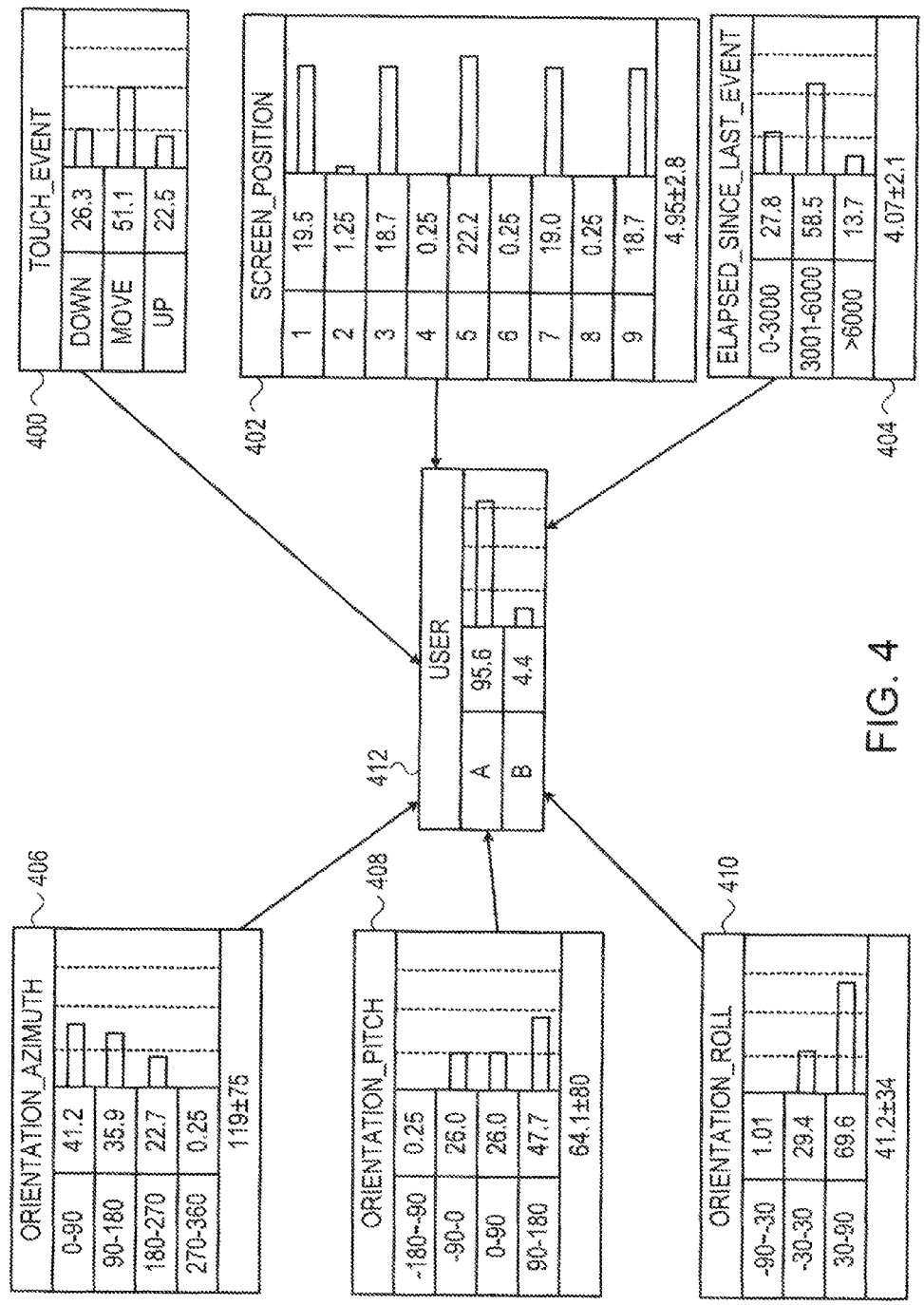
FIG. 4 is a simplified network diagram showing the interrelations of exemplary discretized HCI-metrics data in a Bayesian network for learning a user's HCI behavior from a mobile device, according to preferred embodiments of the present invention.

FIG. 4 is a simplified network diagram showing an exemplary motion-repertoire with the interrelations of discretized motion-characteristics in a Bayesian network for learning a user's HCI behavior pattern from a mobile device, according to an embodiment of the invention.

The motion-characteristic of Event type 216 (from FIG. 2) is discretized into three actions-up, down or move (Panel 400). Screen position 218 (represented by x-y coordinates of the touch screen) is discretized into nine possible rectangular areas representing the area of the screen that was touched (Panel 402). The elapsed time 220 (e.g., since a prior event) is discretized into three possible periods: less than 3000 milliseconds, between 3001 and 6000 milliseconds and more than 6001 milliseconds (Panel 404).

The motion-characteristic of Azimuth 208 is discretized into 4 segments, representing angles between 0 and 90 degrees, angles between 90 and 180 degrees, angles between 180 and 270 degrees and angles between 270 and 360 degrees (Panel 406). Pitch 210 is discretized into 4 segments, representing angles between −180 and −90 degrees, angles between −90 and 0 degrees, angles between 0 and 90 degrees and angles between 90 and 180 degrees (Panel 408). Roll 212 is discretized into 3 segments, representing angles between −90 and −30 degrees, angles between −30 and 30 degrees and angles between 30 and 90 degrees (Panel 410).

For the sake of simplicity parameters in this exemplary implementation are discretized into a small number of possible values. Note that the accuracy required to recognize differences in user motion-characteristics from the motion-repertoire of an authorized user can be calibrated by selectively increasing the number of discrete value intervals for any one or more of the motion-characteristics measured. The network diagram of FIG. 4 shows the six motion-characteristics sampled by the exemplary system and their discretization in a Bayesian network for an authorized user A and an unauthorized user B (Panel 412). The network represents the prior motion-repertoire of authorized user A.

A sample section of a probability table learned by the Bayesian network of the exemplary system to recognize motion-characteristics is shown in Table 2, indicating probabilities for coincidence of the six motion-characteristics derived from device orientation and touch screen event and the nodes learned by the Bayesian network for authorized user A and unauthorized user B.

TABLE 2

| Device Orientation | | | Touch screen event | | | User | |
| --- | --- | --- | --- | --- | --- | --- | --- |
| | | | Event | Screen | Milliseconds elapsed since | | |
| Azimuth | Pitch | Roll | type | Position | previous event | A | B |
| 0 to 90 | 0 to 90 | −30 to 30 | down | 3 | <3 | | |
| 0 to 90 | 0 to 90 | −30 to 30 | down | 3 | 3 to 6 | | |
| 0 to 90 | 0 to 90 | −30 to 30 | down | 3 | >6 | | |
| 0 to 90 | 0 to 90 | −30 to 30 | down | 4 | <3 | | |
| 0 to 90 | 0 to 90 | −30 to 30 | down | 4 | 3 to 6 | | |
| 0 to 90 | 0 to 90 | 30 to 90 | move | 1 | >6 | 87.50% | 12.50% |
| 0 to 90 | 0 to 90 | 30 to 90 | move | 1 | <3 | | |
| 0 to 90 | 0 to 90 | 30 to 90 | move | 1 | 3 to 6 | | |
| 0 to 90 | 0 to 90 | 30 to 90 | move | 2 | >6 | | |
| 0 to 90 | 0 to 90 | 30 to 90 | move | 2 | <3 | 0.00% | 100.00% |
| 0 to 90 | 0 to 90 | 30 to 90 | move | 2 | 3 to 6 | | |

TABLE 2-continued

| Device Orientation | | | Touch screen event | | | User | |
| --- | --- | --- | --- | --- | --- | --- | --- |
| Azimuth | Pitch | Roll | Event type | Screen Position | Milliseconds elapsed since previous event | A | B |
| 0 to 90 | 0 to 90 | 30 to 90 | move | 3 | >6 | 87.50% | 12.50% |
| 0 to 90 | 0 to 90 | 30 to 90 | move | 3 | <3 | | |
| 0 to 90 | 0 to 90 | 30 to 90 | move | 3 | 3 to 6 | | |
| 0 to 90 | 0 to 90 | 30 to 90 | up | 4 | >6 | | |
| 0 to 90 | 0 to 90 | 30 to 90 | up | 4 | <3 | 66.00% | 33.00% |
| 0 to 90 | 0 to 90 | 30 to 90 | up | 4 | 3 to 6 | | |
| 0 to 90 | 0 to 90 | 30 to 90 | up | 5 | >6 | 100.00% | 0.00% |
| 0 to 90 | 0 to 90 | 30 to 90 | up | 5 | <3 | | |
| 0 to 90 | 0 to 90 | 30 to 90 | up | 5 | 3 to 6 | | |
| 0 to 90 | 0 to 90 | 30 to 90 | up | 6 | >6 | 100.00% | 0.00% |
| 0 to 90 | 0 to 90 | 30 to 90 | up | 6 | <3 | | |
| 0 to 90 | 0 to 90 | 30 to 90 | down | 6 | 3 to 6 | | |
| 0 to 90 | 0 to 90 | 30 to 90 | down | 7 | >6 | 83.33% | 16.66% |
| 0 to 90 | 0 to 90 | 30 to 90 | down | 7 | <3 | | |

According to some embodiments the system samples a dynamically selected subset of motion-characteristics that are accessible from the device to optimize performance and maximize recognition accuracy. Recognition of an authorized user by the mobile device can be exploited to facilitate provision of secure automatic authentication to services on a network.

Figure 5:
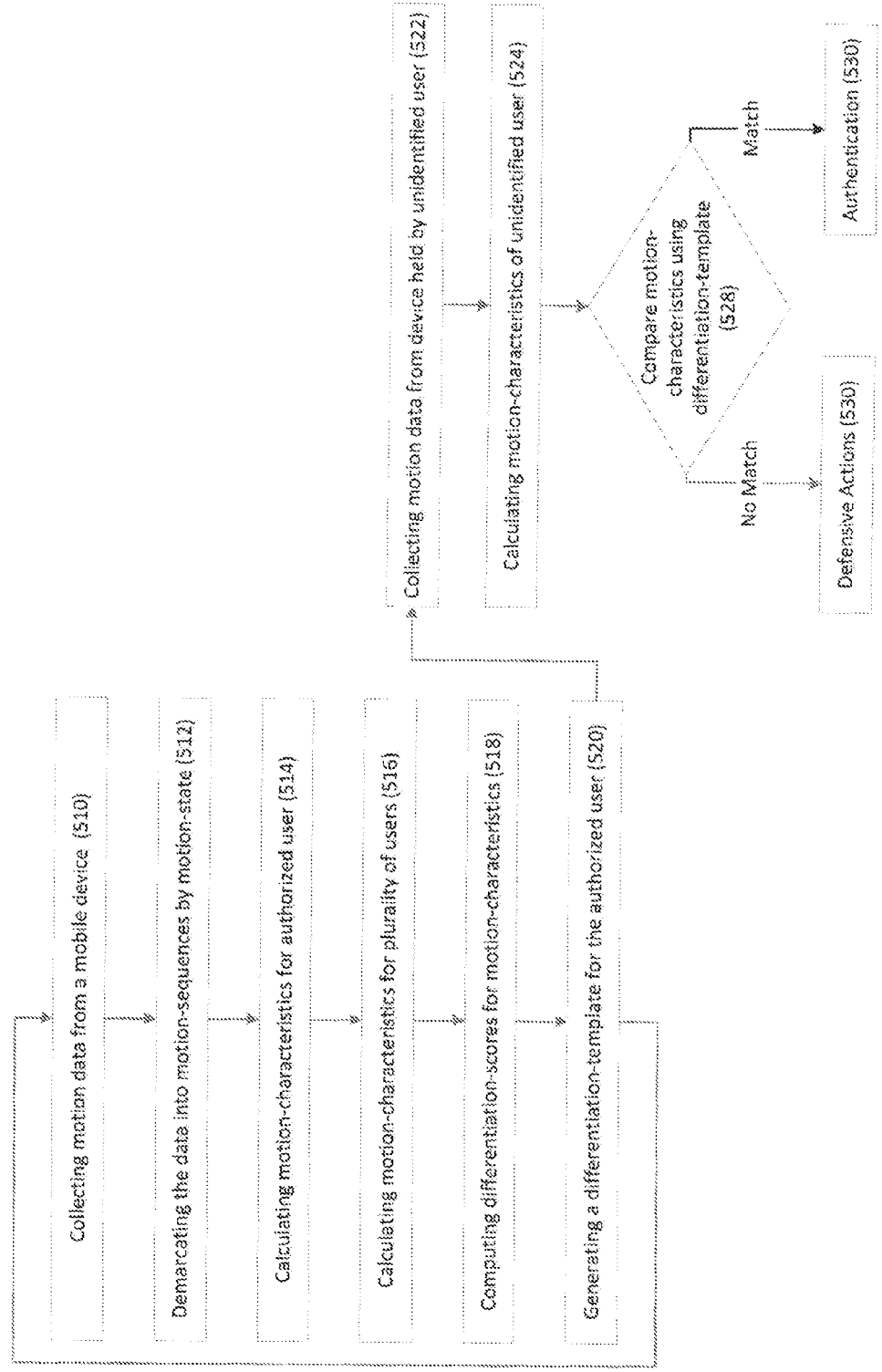
FIG. 5 schematically illustrates a method for user recognition based on comparing motion-characteristics of a current user to a differentiation-template of an authorized user that may be generated by a remote server, according to preferred embodiments of the present invention.

Artificial Intelligence techniques have been widely used to teach computers to recognize patterns. Machine learning is a branch of artificial intelligence concerned with the design and development of algorithms that allow computers to evolve behaviors based on empirical data. Multiple approaches have been taken to train computers to recognize complex patterns and make intelligent decisions based on data, some of these methods include: Decision tree learning, Association rule learning, Artificial neural networks, Genetic programming, Inductive logic programming, Support vector machines, Clustering, Bayesian networks, Reinforcement learning and others. Any of these approaches may be used to practice embodiment of the present invention. According to another embodiment, a method for mobile device user recognition which is schematically illustrated in FIG. 5, includes the general steps of: collecting data from the mobile device (e.g., from sensors on the mobile device) of an authorized user (510); demarcating the time series of motion data into motion-sequences based on changes in the determined motion-state of the device (512), wherein a motion-state describes motion and placement of the device at a point in time and may be extrapolated from ongoing analysis of the sensor data collected from the device; calculating motion-characteristics per motion-state of the authorized user by performing aggregations on data contained in each motion-sequence (514); calculating motion-characteristics of a plurality of users to obtain motion-characteristics of a population (516); computing a differentiation score for each characteristic by comparing the frequency of occurrence of each motion-characteristic of the user to the frequency of occurrence of the equivalent motion-characteristic in the population (518); generating a differentiation-template for each user based on the differentiation scores (520), thus a differentiation-template is generated for an authorized user by comparing motion-characteristics of the authorized user to the motion-characteristics of the population; collecting motion data from the mobile device (e.g., from sensors on the device) of an unidentified user (522); using the differentiation-template to calculate motion-characteristics of the unidentified user (524); determining if the unidentified user is the authorized user based on a comparison of the calculated motion-characteristics to the differentiation-template, e.g., by comparing the motion-characteristics of the unidentified user to the motion-repertoire of the authorized user contained in the differentiation-template to determine if the user (unidentified) is the authorized user (528); triggering defensive actions or providing authentication services based on the determination (530). For example, if it is determined that that the device is not being held by the authorized user defensive actions are triggered and in the case that the motion-characteristic is consistent with the motion-repertoire of the authorized user authentication services are provided.

According to one embodiment, the method may include creating from the motion-characteristics of a plurality of users' motion-characteristics of a population. A frequency of occurrence of a specific motion-characteristic within the motion-characteristics of the population may be compared to the frequency of occurrence of the specific motion-characteristic within the motion-characteristics of the user; a differentiation-template per user may be thus obtained by ranking each motion-characteristic by its degree of difference to the population. The differentiation-template may be used by software running on the device to more efficiently determine if the device is being held by an authorized user.

An exemplary system for generating a differentiation-template according to one embodiment is described below: the system may include software on a server that groups motion-sequences collected from a plurality of users/devices (population) per motion-state, calculates motion-characteristics and converts continuous values into discrete ranges to create population motion-characteristics. For example, and as shown in Table 3, assuming that the range of measures in the population for the motion-characteristic "average of X" having motion-state=9 (device is in hand and moving at a speed that is below walking speed) is between −10.27 and 18.769, and that there are 2400 samples in the database for this motion-state for the population, and that we wish to discretize into 8 ranges, 7 threshold values for differentiating the ranges are calculated such that an approximately equal number of samples falls into each range. Thus, for example, a value of 1 may indicate aggregated values of $x<=-9$; a value of 2: $-9<x<=-6$; a value of 3: $-6<x<=0$; a value of 4: $0<x<=5$; a value of 5: $5<x<=8$; a value of 6: $8<x<=9$; a value of 7: $9<x<10$; and a value of 8: $x>10$, such that ~300 sampled motion-characteristics fall into each range. The software may calculate discretization threshold values for the population for each motion-state for each of the motion-characteristics with discretization into 8 possible ranges for example.

TABLE 3

|  | Motion-state | Motion-characteristic | Discretization thresholds |
|---|---|---|---|
| Example characteristic | 9 | (101) Average of X | −9, −6, 0, 5, 8, 9, 10 |

For example, software on the server may compare the frequencies of occurrence of each motion-characteristic in the data from an individual user/device to occurrence frequencies of motion-characteristics calculated for the population and assign a differentiation score for each motion-characteristic of the user. The probability table below (Table 4) demonstrates determination of a differentiation score using the example data provided above.

TABLE 4

|  | 1 | 2 | 3 | 4 | 5 | 6 | 7 | 8 | Total |
|---|---|---|---|---|---|---|---|---|---|
| User A | 300 | 50 | 200 |  |  |  |  |  | 550 |
|  | 55% | 9% | 36% |  |  |  |  |  | 100% |
| Population | 300 | 300 | 300 | 300 | 300 | 300 | 300 | 300 | 2400 |
|  | 12.5% | 12.5% | 12.5% | 12.5% | 12.5% | 12.5% | 12.5% | 12.5% | 100% |
| Difference | 42.5 | 3.5 | 23.5 | 12.5 | 12.5 | 12.5 | 12.5 | 12.5 | 132 |

For the example motion-characteristic above, the differentiation score calculated would be: (42.5+3.5+23.5+12.5+12.5+12.5+12.5+12.5)/8=16.5.

In one embodiment, motion-characteristics are ranked by score for each motion-state and a table comprising the top 16 ranked motion-characteristics for each motion-state (e.g., 2*16 records when only hand-held static motion-states 9 and 13 are considered) is prepared for returning to the user's device as a differentiation-template.

An example record in the differentiation-template that would be returned to the user's device for the example described above, would take the following form:

| Motion-state | Motion-characteristic Id | Disc-1 | Disc-2 | Disc-3 | Disc-4 | Disc-5 | Disc-6 | Disc-7 |
|---|---|---|---|---|---|---|---|---|
| 9 | 101 (average X) | −9 | −6 | 0 | 5 | 8 | 9 | 10 |
| P1 | P2 | P3 | P4 | P5 | P6 | P7 | P8 |  |
| 42.5 | −3.5 | 23.5 | −12.5 | −12.5 | −12.5 | −12.5 | −12.5 |  | wherein the first two columns designate the motion-state and unique id of each motion-characteristic, columns Disc-1 to Disc-7 designate the threshold values for discretization and columns P1 to P8 designate scores representing the probability occurrence of values in each range in relation to population values. These are designed so that during the step of comparing the motion-characteristics of the device of an unidentified user to the authorized user's motion-repertoire to determine if the user is the authorized user (Step 528), positive scores will be calculated when a new sample conforms to the frequency of occurrence relative to the population that was calculated for the differentiation-template and negative scores will be attributed when the new sample measure contradicts the relative frequency calculated.

Unexpectedly, individual differences were found between the sets of motion-characteristics that best differentiate an individual user from the population.

Tables 5A and 5B below show, for example, differentiation scores of the 8 top ranking motion-characteristics in motion-state 13 for 2 different users, user A and user B, illustrating these individual differences.

TABLE 5B

| User B | |
|---|---|
| Characteristic | Score |
| X First | 21.2 |
| X Sum | 19.5 |
| X Speed (acceleration * duration) | 19 |
| Y Last | 18.8 |
| Y Distance | 18.7 |

TABLE 5B-continued

| User B | |
|---|---|
| Characteristic | Score |
| (acceleration * duration * duration) |  |
| dZ Sum positive | 18.6 |
| XYZ Average | 17.2 |
| Z Standard deviation | 17.1 |

TABLE 5A

| User A | |
|---|---|
| Characteristic | Score |
| Y Average | 18.3 |
| Y Jitter | 17.9 |
| Z Average | 17.8 |
| Z Jitter | 17.2 |
| Y Last | 16.5 |
| Z Max | 16.4 |
| Z Last | 16.1 |
| X Max-Min | 15.9 |

In addition to blocking access by unauthorized users, the capability of a device to recognize who is using it, may be useful for automatic authentication on a network. Once the device recognizes that the device is being used by its authorized owner, various techniques can be applied (alone or in combination) for securely and automatically authenticating the device and its owner to various networked services. Such techniques may include the following methods:

Combining a motion-repertoire with a unique device ID to generate a unique network password representing the combination of device and user Accessing encrypted network authentication credentials stored on the device when the authorized user is detected Accessing a private key that can be used to apply a digital signature when the authorized user is detected Exposing a private key that can be used to apply a digital signature when the device is operated by a recognized authorized user.

Depositing the authorized user's motion-repertoire with a 3rd party certificate authority for use as an additional identity verification credential.

Automatic authentication to network services can be useful for multiple applications including: authentication of a user to a corporate network, authentication to content subscription services (e.g., music, news, games, adult entertainment, etc.) authentication to banking services or for accessing any website that requires a user to login. Automatic authentication based on a device's capability to recognize who is holding it should be useful for authorizing a variety of transactions, including authorization of payment instructions and opening physical barriers.

Figure 6:
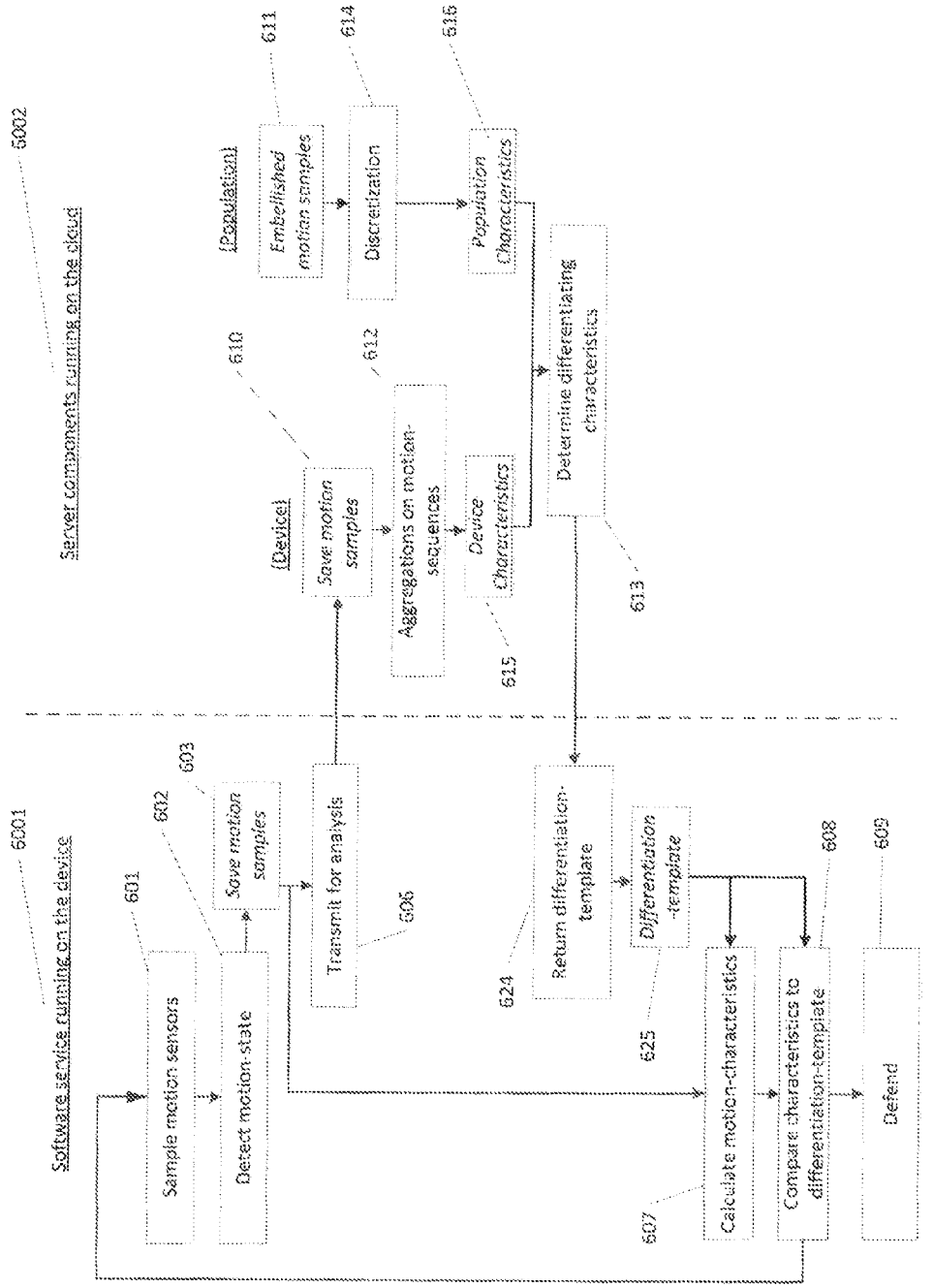
FIG. 6 schematically illustrates a system in which some processing units are located at a remote server, according to an embodiment of the invention.

A system according to embodiments of the invention, in which some processing units are located at a remote server, is schematically illustrated in FIG. 6.

In one embodiment, sampling data from a sensor of the mobile device (601), detecting a motion-state of the device (602) and embellishing the data with attributes (603) are performed on the mobile device 6001. Calculating current motion-characteristics (607) and comparison of current motion-characteristics collected by the device to the authorized user's differentiation-template (608) may be performed on the device 6001 and defensive actions (609) may be triggered on the device.

In addition or alternatively embellished data may be transferred (606) to server components 6002 located on the Internet cloud and may be further processed at a remote server, for example, by aggregating motion-sequences (612) and determining differentiating motion-characteristics (613) based on data from a plurality of devices that is processed in parallel on the server (e.g., embellished samples of a population (611) that are discretized (614) on the server to obtain motion-characteristics of a population (616)).

Once processing on server components 6002 has detected differentiating characteristics, the data is returned to the device (624) as a differentiation-template (625), which is then used for efficient comparison of motion-characteristics collected by the device to the most differentiating motion-characteristics of the authorized user's motion-repertoire according to the differentiation-template (608) and defensive actions may be triggered on the device (609) accordingly.

According to one embodiment, the background software collects the stream of embellished data in a data file saved to static memory on the device (603). At defined intervals (for example, every 24 hours) the software performs an API call to a server component residing on the Internet cloud to transfer the collected data file of embellished accelerometer samples for analysis (606). Data may be stored in a database at the server (610).

In one embodiment, creating from the motion-sequences motion-characteristics includes aggregating the motion-sequences (612). For example, software on the server may demarcate the embellished accelerometer data into motion-sequences based on the motion-state attribute of each record and calculate aggregations for each motion-sequence. Motion-sequences that extend beyond 3 seconds, for example, are separated into 3-second chunks. In one embodiment aggregated motion-sequences can be calculated to obtain data regarding, for example, jitter of the user's hand while holding the device.

In one embodiment sample data from a plurality of users (611) is demarcated into motion-sequences, aggregated and discretized (614) and motion-characteristics of a population (616) are calculated. Motion-characteristics of the device (615) are compared to motion-characteristics of the population to determine the best differentiating characteristics (613) which may be performed as described above.

According to some embodiments, software on the user's device requests a differentiation-template from the server. The background software may perform an API call to the server at some intervals to collect the differentiation-template prepared for it by the server (624). A table comprising the template values may be loaded into a dynamic memory of the device.

The background software performs analysis on motion-characteristics extracted from the current data stream using the differentiation-template (607). In the case of an example template comprising 16 best differentiating motion-characteristics of an authorized user, aggregation and discretization is performed on each motion-sequence in the data stream for each of the 16 characteristics appearing in the differentiation-template for a current motion-state, according to threshold values defined in the differentiation-template and implementing logic that emulates the aggregation calculations performed by the server for calculating only the motion-characteristics of interest. When comparing motion-characteristics to a differentiation-template to recognize an authorized user (608), for each motion-sequence, each of the 16 characteristics is scored based on the probability score appearing in the differentiation-template for the motion-state and motion-characteristic. Scores for the 16 characteristics are summed to comprise a detection score. A high score may indicate the likelihood that the motion-sequence was generated while in the hands of the authorized user and a low score may indicate the probability of an unauthorized user.

In the case where an unauthorized user is detected, defensive actions are triggered, and possibly, progressively severe defensive actions applied (609).

For example, when the background software detects a motion-sequence that scores below a configured threshold value (for example 10), the software suspects that the device is held by an unauthorized user and logic for performing defensive actions is triggered. The software may perform a configurable combination of progressively severe defensive actions when an unauthorized user is detected, including audio alert, device lockout, deletion of files and sending a message (email or SMS) to a designated address with current location data and other information sensed by the device.

Alternatively, if it is determined that the device is being held by the user and not by an unauthorized user, the determination may be used in one or more of: privacy protection, authentication to an external system, use as a universal key and authorizing payments.

An embodiment of the present invention provides for the capability of the detection system to automatically calibrate itself to increase the accuracy of recognition using a strategy that is personalized for an individual authorized user and a device.

The accuracy of biometric systems is typically measured using a FAR (False Acceptance Ratio) and a FRR (False Rejection Ratio). Ideally both of these ratios should be as small as possible, but reducing one (by applying more stringent recognition criteria for example) is typically done at the expense of increasing the other.

The number of characteristics sampled (601) and the number of intervals discretized for calculating motion-characteristics (607) impacts device performance. Devices vary in hardware capabilities, so performance constraints may dictate sampling fewer characteristics. Individual user behavior characteristics differ such that a particular motion-characteristic or combination of characteristics may be more efficient in differentiating between an individual authorized user and an intruder.

The recognition accuracy of the proposed system can be dynamically controlled by software through: (1) sampling more or fewer different motion-characteristics (from the many available on a modern mobile device) and (2) discretizing the sample variables collected into smaller or larger intervals.

By monitoring FAR & FRR for an individual authorized user, the system has the capability to dynamically scale itself appropriately to maximize accuracy for an individual device and user. The proposed system monitors device performance and FAR and FRR values for an individual authorized user to detect and automatically calibrate itself to provide an optimum balance between device performance and recognition accuracy for an individual authorized user.

Advantages offered by embodiments of the present invention include, among others, the capability for dynamic self-calibration of the system.

For example, triggering of acceleration events (601) and the subsequent processing steps performed by the background software may consume processing resources on the device and may be detrimental to battery conservation. To conserve energy, the system can regulate the frequency in which acceleration events are triggered dependent on the motion-state determined (602). Different states may warrant different collection frequencies, thus for example, when the device is not being held by a user, it may be adequate to briefly sample the accelerator every 10 seconds to determine if a change of state has occurred instead of continuous sampling that may be warranted when the device is in a user's hand.

In another example, the frequency of sending motion samples of the device to the remote server (606) may be based on the consistency of differentiation-templates that are obtained from the remote server. While software on the device initiates calls to the server to submit data and to collect a differentiation-template (606 and 624), the server may determine the timing of these calls. According to one embodiment, the response message returned by the server to each API call (606 and 624) includes a time field indicating to the software service on the device the time to call back with a subsequent request. This technique has several advantages:

1. by estimating the time required for analyzing data received from the user (and from multiple other users), the server is able to throttle its work load and avoid unnecessary API calls from devices; and 2. by comparing the similarity of the differentiation-template returned to previously transmitted templates, the server is able to gauge the degree of consistency of the template over time and to determine progressively less frequent API calls by the device to the server as the degree of consistency increases.

For example, at initial installation the software service on the device may be programmed to call the server every 24 hours, following several API calls, the server may determine that a weekly or monthly frequency becomes more appropriate based on the similarity of the newly learned differentiation-template to one that was previously learned.

In another example, a measure of overall recognition accuracy (device learning-stage) may be determined by the server. The server may determine the learning-stage of the device by running a simulation of the steps of requesting a differentiation-template from the server and detecting unauthorized use at the server on a random sample of motion-sequences comprising an equal number of records from device and population historical data. Counts of FRR (False Rejection Ratio) (motion-characteristics from the population not detected as unauthorized users) and FAR (False Acceptance Ratio) (motion-sequences from device detected as unauthorized users) are calculated and a learning-stage is determined by comparing these counts.

In another example, a measure of overall recognition accuracy (device learning-stage) may be determined by the server by comparing a currently generated differentiation-template of a user to prior templates generated for the same user and by gauging the degree of template consistency relative to threshold values to determine the device learning-stage of a user. The learning-stage measure may be returned to the device together with the differentiation-template for determining appropriate defensive actions for example at Step 609.

Figure 7:
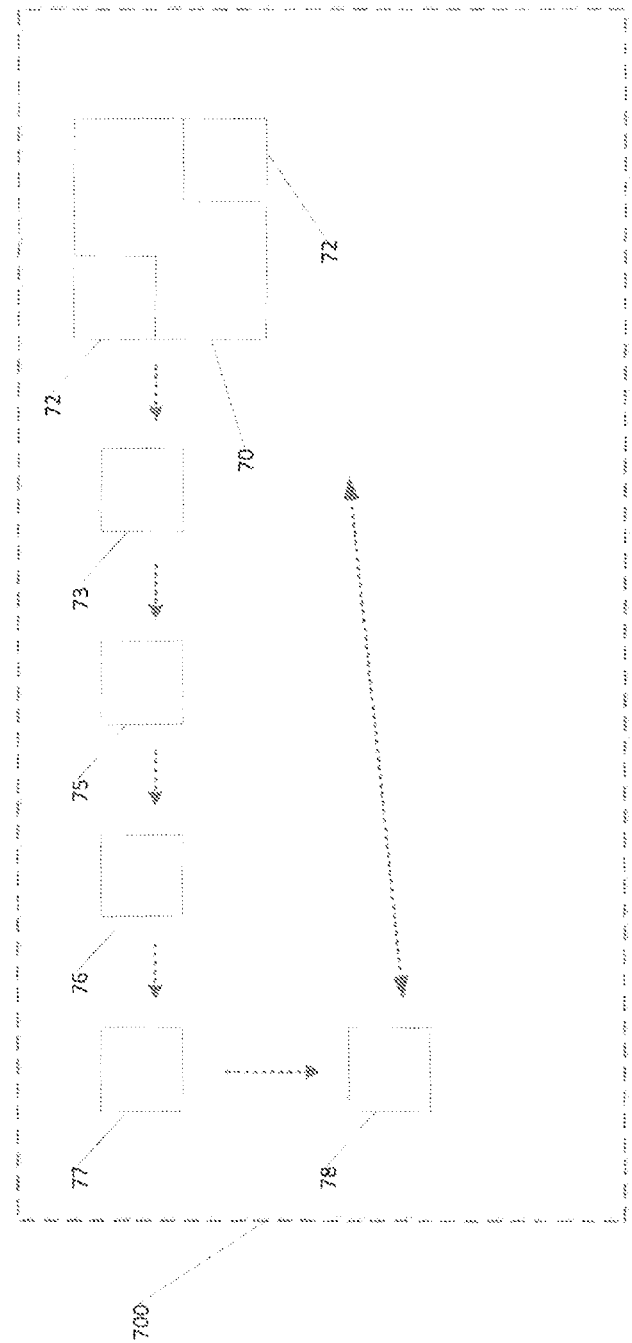
FIG. 7 schematically illustrates a system for user recognition, according to preferred embodiments of the present invention.

According to one embodiment of the invention there is provided a system for mobile device user recognition. The system according to one embodiment of the invention is schematically illustrated in FIG. 7.

According to one embodiment, the system 700 includes a mobile device 70 being used by a user, the mobile device having one or more motion sensors 72, such as an accelerometer, gyroscope or touch screen; and a processor 73 to receive data from the device sensors to determine, according to one embodiment, motion-states of the device based on the received data. A motion-state of the device describes the motion and placement of the device 70 at a period in time. Motion-state is extrapolated from analysis of the sensor data outputted by the device at a particular point in time.

Also included in the system is a unit 75 to demarcate motion-sequences based on a change in motion-state or after an elapsed time of the sequence (for example 3 seconds) and create motion-characteristics based on aggregations calculated on a motion-sequence; a unit 76 to generate a motion-repertoire of an authorized user by accumulating the motion-characteristics collected; a processor 77 to compare freshly collected motion-characteristics to the motion-repertoire of an authorized user and to determine, based on the comparison, if the device 70 is being used by the authorized user; and a unit 78 for triggering defensive actions or for enabling authentication based on the determination if the device is being operated by the authorized user.

According to one embodiment the motion-characteristics of the device that are created by the unit 75 are indicative of the user's hand movements while the user is holding the device, perhaps just before using the device. Thus, according to one embodiment, hand movement parameters are searched for while the user is stationary (e.g., slow moving or resting) such that the motion-characteristics are obtained from sensor input indicating that the user is moving at below walking speed.

According to one embodiment the system 700 may include a processor to calculate motion-sequences of a plurality of devices (not shown) to obtain motion-characteristics of a population and to compare the motion-characteristics of a user to the motion-characteristics of the population to rank motion-characteristics of a user by the degree that a distribution of occurrences of the characteristic sampled for a user differs from the distribution of occurrences in the population; thus generating a differentiation-template that can assist in identifying if a user of the device 70 is an authorized user.

Some of the units or processors that are part of the system 700 may be located on a remote server (as shown in FIG. 6). For example, the processor to calculate motion-sequences of a plurality of devices may be part of a remote server which is in communication with the mobile device 70.

If it is determined that a user is not an authorized user defensive actions may be triggered by unit 78. Defensive actions may include actions such as blocking access to features of the device. Alternatively, unit 78 may enable authentication, including, for example, privacy protection, authentication to an external system, authorizing payments, enabling use of the device as a universal key for providing physical access and identifying friendly forces in a battle field environment.

While the present invention has been described with respect to a limited number of embodiments, it will be appreciated that many variations, modifications, and other applications of the present invention may be made.

What is claimed is:

1. A method for unobtrusively recognizing a user of a mobile device, the method comprising the steps of:
   (a) unobtrusively and continuously collecting a stream of motion data from the mobile device during normal device usage by monitoring standard authorized-user interaction with the device, without any form of challenge or device-specified action;
   (b) determining a plurality of motion-states from said stream of motion data, wherein a motion-state refers to a placement and a speed of the mobile device at a point in time;
   (c) demarcating said stream of said motion data into user motion-sequences based on changes in said plurality of motion-states;
   (d) calculating a plurality of user motion-characteristics from said user motion-sequences locally within the mobile device;
   (e) generating a motion-repertoire from a subset of said plurality of said user motion-characteristics, whereby said motion-repertoire enables unobtrusive recognition of the user; and
   (f) detecting unidentified motion-sequences having motion-characteristics that are not associated with said motion-repertoire, thereby enabling unobtrusive recognition of unidentified usage.

2. The method of claim 1, the method further comprising the step of:
   (g) upon said step of detecting, triggering a defensive action and/or providing authentication services, wherein said defensive action includes at least one action selected from the group consisting of: blocking access to the device, blocking access to selected applications, deleting sensitive data, encrypting sensitive data, setting off a siren, sending a notification to a designated individual associated with the device, and wherein said authentication services include at least one service selected from the group consisting of: privacy protection, authentication to an external system, use as a universal key, authorizing a payment, and identifying friendly forces in a battle-field environment.

3. The method of claim 1, wherein said step of detecting is performed repeatedly, during said normal device usage, thereby providing perpetual protection of the device from unauthorized usage.

4. The method of claim 1, wherein said motion data is obtained from at least one sensor selected from the group consisting of: a motion sensor, a haptic sensor, an accelerometer, a gyroscope, a touch sensor, and a combination thereof.

5. The method of claim 1, wherein said steps of collecting, determining, demarcating, calculating, and generating are performed repeatedly during said standard authorized-user interaction, thereby providing ongoing improvement to recognition accuracy.

6. The method of claim 5,
   wherein said step of detecting is initiated based on a learning-stage parameter, as a degree of user recognition, indicating whether a threshold value has been reached in said motion-repertoire in order to initiate said step of detecting, and wherein said threshold value is based on at least one measurement selected from the group consisting of: automatically basing said learning-stage parameter on a quantity of said motion-sequences collected, time elapsed, or a statistical variation of said motion data collected, and manually setting said learning-stage parameter by the user.

7. The method of claim 6, wherein said learning-stage parameter is operative to regulate a trigger for a defensive action and/or providing authentication services upon detecting unidentified motion-characteristics that are not associated with said motion-repertoire.

8. The method of claim 1, wherein said step of collecting is performed at a frequency based on said motion-state.

9. The method of claim 1, wherein said motion-state is determined by:
   (i) comparing at least one current motion-sensor value to at least one prior motion-sensor value; and
   (ii) assessing a degree of change in said motion-sensor values based on an Absolute Total Acceleration Change (ATAC).

10. The method of claim 1, wherein said placement has at least one designation selected from the group consisting of: a hand-held state, an on-body state, a pocket state, a flat rest-state, and a non-flat rest-state; and wherein said speed has at least one designation selected from the group consisting of: a traveling state at or above a delimited speed, a walking state, a running state, a hand-moving state, a stable state, and a motionless state.

11. The method of claim 1, the method further comprising the steps of:
   (g) discretizing said motion-characteristics into discrete values; and
   (h) selectively increasing the number of said discrete values, thereby dynamically controlling recognition accuracy.

12. A device for unobtrusively recognizing a mobile-device user, the device comprising:
   (a) a processing module including:
      (i) a CPU for performing computational operations;
      (ii) a memory module for storing data; and
      (iii) at least one sensor for detecting interaction with the device; and
   (b) a recognition module, operationally connected to said processing module, configured for:
      (i) unobtrusively and continuously collecting a stream of motion data from the mobile device during normal device usage by monitoring standard authorized-user interaction with the device, without any form of challenge or device-specified action;

(ii) determining a plurality of motion-states from said stream of motion data, wherein a motion-state refers to a placement and a speed of the mobile device at a point in time;

(iii) demarcating said stream of said motion data into user motion-sequences based on changes in said plurality of motion-states;

(iv) calculating a plurality of user motion-characteristics from said user motion-sequences locally within the mobile device;

(v) generating a motion-repertoire from a subset of said plurality of said user motion-characteristics, whereby said motion-repertoire enables unobtrusive recognition of the user; and (vi) detecting unidentified motion-sequences having motion-characteristics that are not associated with said motion-repertoire, thereby enabling unobtrusive recognition of unidentified usage.

13. A non-transitory computer-readable medium, having computer-readable code embodied on the non-transitory computer-readable medium, the computer-readable code comprising:

(a) program code for unobtrusively and continuously collecting a stream of motion data from the mobile device during normal device usage by monitoring standard authorized-user interaction with the device, without any form of challenge or device-specified action;

(b) program code for determining a plurality of motion-states from said stream of motion data, wherein a motion-state refers to a placement and a speed of the mobile device at a point in time;

(c) program code for demarcating said stream of said motion data into user motion-sequences based on changes in said plurality of motion-states;

(d) program code for calculating a plurality of user motion-characteristics from said user motion-sequences locally within the mobile device;

(e) program code for generating a motion-repertoire from a subset of said plurality of said user motion-characteristics, whereby said motion-repertoire enables unobtrusive recognition of the user; and (f) program code for detecting unidentified motion-sequences having motion-characteristics that are not associated with said motion-repertoire, thereby enabling unobtrusive recognition of unidentified usage.

14. A method for unobtrusively recognizing a mobile-device user, the method comprising the steps of:

(a) utilizing a plurality of population motion-sequences demarcated from a stream of motion data of a plurality of users of mobile devices;

(b) calculating population motion-characteristics from said plurality of population motion-sequences;

(c) comparing an occurrence frequency of each user motion-characteristic in a user motion-repertoire of a subset of a plurality of user motion-sequences to an occurrence frequency of a respective population motion-characteristic in said plurality of said population motion-sequences;

(d) calculating a respective probability indicator representing a likelihood that a respective user motion-characteristic is associated with a respective user motion-sequence of a particular user;

(e) generating a differentiation-template for each said user having a plurality of said respective probability indicators for each said user motion-sequence;

(f) detecting motion-sequences having motion-characteristics that conform with said differentiation-template; and (g) continuously calculating a probability authorized-use indicator representing a likelihood that a given motion-sequence is associated with an authorized user of the mobile device, thereby enabling unobtrusive recognition of unidentified usage.

15. A system for unobtrusively recognizing a mobile-device user, the system comprising:

(a) a server including:
  (i) a CPU for performing computational operations;
  (ii) a memory module for storing data; and (b) a processing module configured for:
  (i) utilizing a plurality of population motion-sequences demarcated from a stream of motion data of a plurality of users of mobile devices;
  (ii) calculating population motion-characteristics from said plurality of population motion-sequences;
  (iii) comparing an occurrence frequency of each user motion-characteristic in a user motion-repertoire of a subset of a plurality of user motion-sequences to an occurrence frequency of a respective population motion-characteristic in said plurality of said population motion-sequences;
  (iv) calculating a respective probability indicator representing a likelihood that a respective user motion-characteristic is associated with a respective user motion-sequence of a particular user;
  (v) generating a differentiation-template for each said user having a plurality of said respective probability indicators for each said user motion-sequence;
  (vi) detecting motion-sequences having motion-characteristics that conform with said differentiation-template; and
  (vii) continuously calculating a probability authorized-use indicator representing a likelihood that a given motion-sequence is associated with an authorized user of the mobile device, thereby enabling unobtrusive recognition of unidentified usage.

16. A non-transitory computer-readable medium, having computer-readable code embodied on the non-transitory computer-readable medium, the computer-readable code comprising:

(a) program code for utilizing a plurality of population motion-sequences demarcated from a stream of motion data of a plurality of users of mobile devices;

(b) program code for calculating population motion-characteristics from said plurality of population motion-sequences;

(c) program code for comparing an occurrence frequency of each user motion-characteristic in a user motion-repertoire of a subset of a plurality of user motion-sequences to an occurrence frequency of a respective population motion-characteristic in said plurality of said population motion-sequences;

(d) program code for calculating a respective probability indicator representing a likelihood that a respective user motion-characteristic is associated with a respective user motion-sequence of a particular user;

(e) program code for generating a differentiation-template for each said user having a plurality of said respective probability indicators for each said user motion-sequence;

(f) program code for detecting motion-sequences having motion-characteristics that conform with said differentiation-template; and (g) program code for continuously calculating a probability authorized-use indicator representing a likelihood that a given motion-sequence is associated with an authorized user of the mobile device, thereby enabling unobtrusive recognition of unidentified usage.

17. The method of claim 1, wherein said stream includes data collected from at least one sensor selected from the group consisting of: an accelerometer sensor and a touch sensor.

18. The device of claim 12, wherein said stream includes data collected from at least one sensor selected from the group consisting of: an accelerometer sensor and a touch sensor.

19. The computer-readable medium of claim 13, wherein said stream includes data collected from at least one sensor selected from the group consisting of: an accelerometer sensor and a touch sensor.

20. The method of claim 14, wherein said stream includes data collected from at least one sensor selected from the group consisting of: an accelerometer sensor and a touch sensor.

21. The system of claim 15, wherein said stream includes data collected from at least one sensor selected from the group consisting of: an accelerometer sensor and a touch sensor.

22. The computer-readable medium of claim 16, wherein said stream includes data collected from at least one sensor selected from the group consisting of: an accelerometer sensor and a touch sensor.

\* \* \* \* \*